United States Patent Office 2,781,871
Patented Feb. 19, 1957

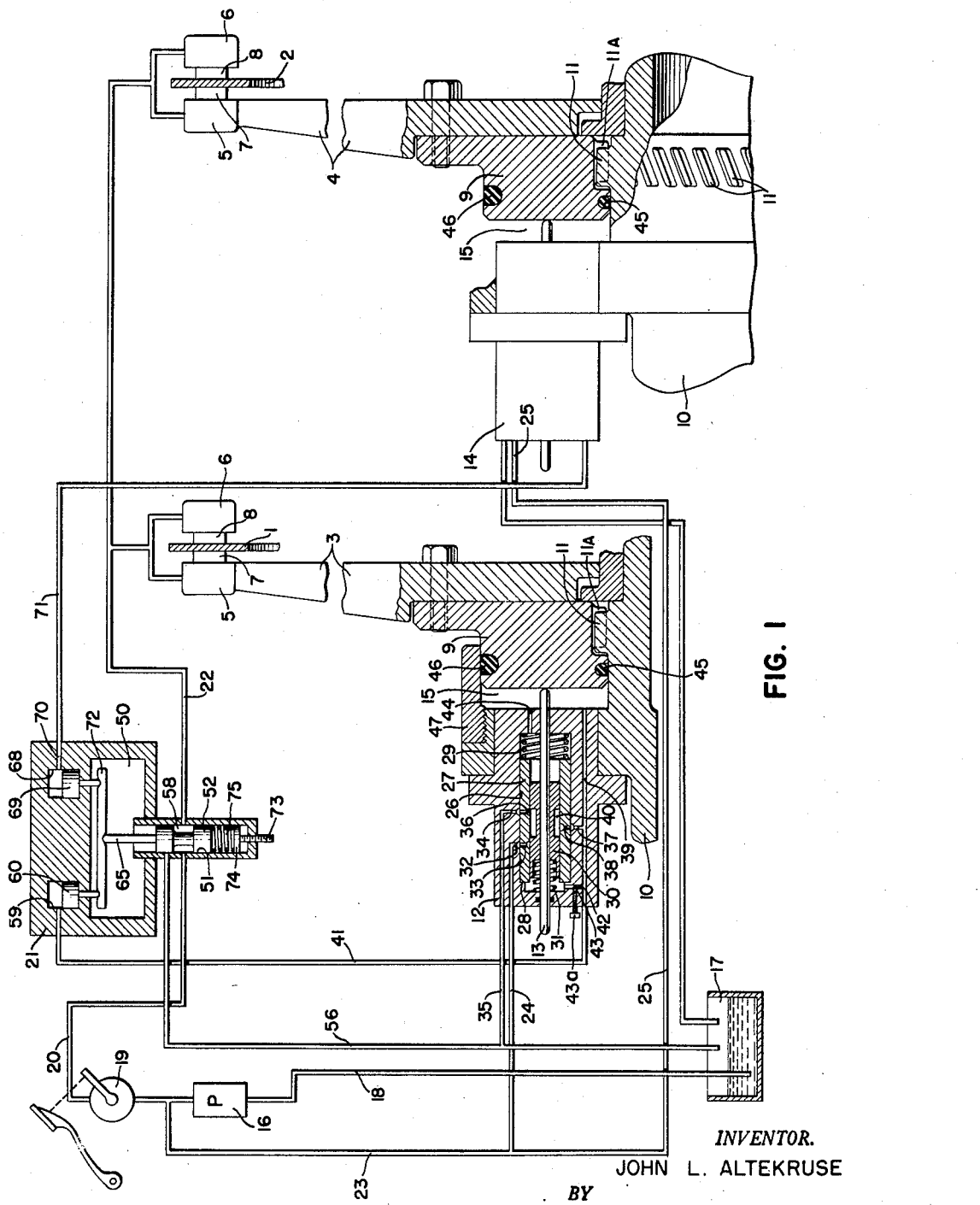

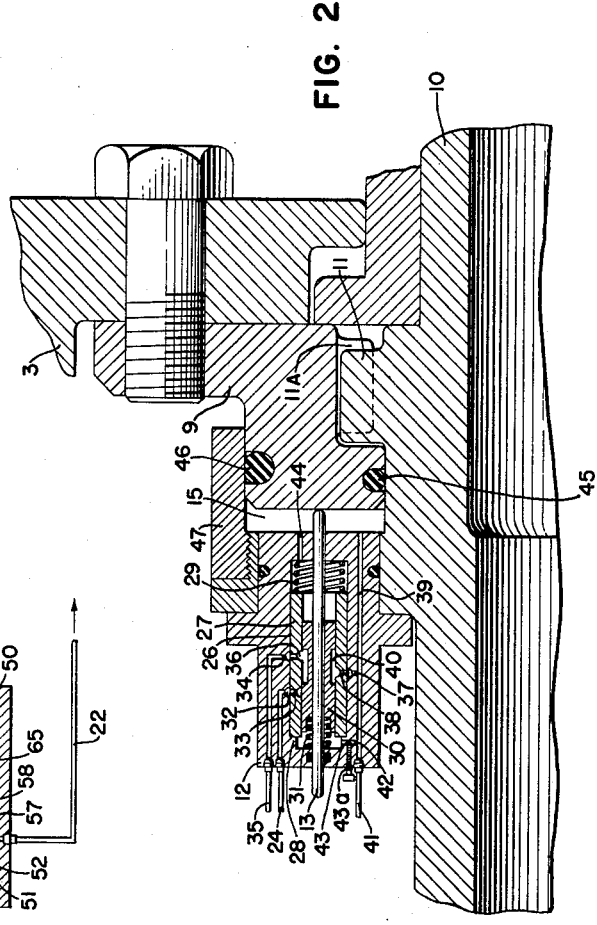

2,781,871

HYDRAULIC TORQUE CONTROLLER FOR BRAKES

John L. Altekruse, Cuyahoga Falls, Ohio, assignor to The Goodyear Tire & Rubber Company, Akron, Ohio, a corporation of Ohio Application April 13, 1954, Serial No. 422,743

6 Claims. (Cl. 188—152)

This invention relates to the control of torque in the application of hydraulically operated brakes and is especially useful in the operation of brakes of vehicles such as aircraft although features of the invention are also useful in the control of other brakes, especially as applied to land operated vehicles.

In the application of brakes to the wheels of aircraft where the velocity of the aircraft must be reduced rapidly from its velocity at touchdown to zero velocity, brake equipment adapted to provide high torque is employed. In such situations it becomes desirable to limit the torque due to forceful application of the brakes to prevent local wear of the tires and damage to the wheels and the undercarriage due to too severe loading thereof.

It is an object of the present invention to limit to a safe value the horizontal loading of an aircraft landing gear during application of the brake.

Another object is to provide the most efficient application of brakes to stop the vehicle in the least distance without damage to the tires, wheels and undercarriage.

A still further object is to provide control of brakes from torque sensing means located at a plurality of wheels and operating a single control valve.

Other objects are to automatically control torque due to severe brake application, to reduce local wear of the tires and to prevent damage to the wheels.

These and other objects will appear from the following description and the accompanying drawings.

In the drawings:

Fig. 1 is a diagrammatic view of portions of two wheel brakes, a hydraulic pressure supply including a pump, a return sump, a foot-operated valve supplying fluid under pressure to the brakes, two servo valves, and the torque control valve with the connecting pipe lines, one of the servo valves and the torque control valve being shown in section;

Fig. 2 is a sectional view of a wheel and its brake and servo valve and the wheel axle, portions being broken away; and Fig. 3 is a sectional view of the torque control valve as constructed for use with a single servo valve.

Referring to the drawings, and first to Fig. 1 thereof, the numerals 1, 2 indicate brake discs carried by separate wheels of an aircraft undercarriage, not shown. Adjacent the wheels respectively are brake supports 3, 4. Each brake support carries a pair of brake cylinders such as 5, 6 for forcing a pair of brake shoes 7, 8 against a brake disc. Brake support 3 includes an annular piston and supporting collar 9 mounted on an axle 10, about which the wheel is mounted for rotation. The shaft has inclined splines 11 for slidably engaging similarly inclined spline 11A of the collar 9, the arrangement being such that when the brake shoes 7, 8 are applied to the disc 1, the brake supports 3, 4 tend to rotate about the fixed axle causing the collar 9 to tend to move axially of the axle by virtue of engagement with the inclined splines.

A servo valve 12 is mounted on the fixed axle 10 adjacent the collar 9 with its valve plunger 13 in position to be engaged and moved axially by movement of the collar. A similar servo valve 14 is provided at the brake support 4. One of these servo valves is supplied at each brake and is more clearly shown in Fig. 2. Its purpose is to provide pressure to chamber 15 to bias the axial motion of collar 9.

A high pressure supply of hydraulic fluid is supplied by a pump 16 which draws fluid from a sump 17 through a pipe 18 and supplies fluid under pressure to a brake pedal valve 19 controlled by the pilot from which it is supplied through a pipe 20 to a torque control valve 21. The control valve has a three-way valve portion with a normally open through-passage to a pipe 22 which connects it to brake cylinders 5, 6. The brake pedal valve 19 is a two-way type and is shown in Fig. 1 in the pedal depressed or open position. A branch of the high pressure supply pipe from pump 16 supplies hydraulic fluid under pressure through a pipe 23 to branch pipes 24, 25 to the servo valves.

Each servo valve, as seen in Fig. 2, has an axial cylinder bore 26 in which a sleeve 27 is mounted. The sleeve is held in the position shown against axial movement by a stop shoulder 28 at one end and by a compression coil spring 29 at the other end. A valve spool 30 is secured to plunger 13 and is slidably mounted within sleeve 27. A compression coil spring 31 is mounted about plunger 13 between the left end of the cylinder bore and the spool 30 and urges the spool and plunger normally to the right. A port 32 in the body of valve 12 is connected to pressure supply pipe 24, heretofore mentioned, and is aligned with a port 33 through sleeve 27. A second port 34 through the valve body is connected by an exhaust pipe 35 to sump 17 and is aligned with a port 36 through sleeve 27. A third port 37 through valve body 12 is located in alignment with a port 38 through sleeve 27 between ports 33 and 34 thereof and connects with a passage 39. An annular groove 40 of the valve spool 30 normally connects passage 39 to the exhaust pipe 35 and closes it to the high pressure fluid supply pipe 24 as shown in Fig. 2. Passage 39 opens to chamber 15 and connects with pipe 41. Should collar 9 move to the left under high brake torque, spool 30 would be moved to the left by plunger 13, compressing spring 31 and connecting passage 39 with high pressure supply pipe 24 and disconnecting it from exhaust pipe 35.

Through passage 39, chamber 15 is likewise supplied with sufficient pressure to resist the axial motion of collar 9. Application of brake torque thus causes axial motion to the left of collar 9 until spool valve 30 admits sufficient pressure to chamber 15 to stop the motion. Pressure in chamber 15 is therefore a measure of brake torque.

The space between the left end of cylinder bore 26 and the shoulder 28 thereof is also connected to passage 39 by a port 42 and a damping orifice 43 is provided in this port by an adjustable screw 43a partially closing the port. The arrangement is such that pressure in passage 39 is applied to the left end of the sleeve 26. The left end of spool 30 is also exposed to such pressure but this is balanced by an equal pressure at its opposite end. For supplying such balancing pressure, chamber 15, between collar 9 and valve body 12, is connected to pipe 41 by passage 39 formed in the valve body and to the space between the right end of valve spool 30 and valve body 12 by a vent hole 44. The space 15 is sealed off from the atmosphere by an O-ring 45 between axle 10 and collar 9 and a second O-ring 46 between a cylindrical surface of the collar 9 and a sleeve 47 mounted on axle 10 and surrounding the cylindrical surface of the collar 9.

A torque control valve for controlling pressure in the brake cylinders of a single wheel in response to operation of the servo valve is indicated by the numeral 48 and is shown in Fig. 3. It comprises a body 49 having an enclosed chamber 50 from which extend a plurality of cylinder bores. One of these cylinder bores 51 provides the body of a three-way valve and has a valve spool 52 slidably mounted therein. A compression coil spring 53 is mounted in the bore at the closed end thereof and urges the valve spool toward the chamber 50. A port 54 into the bore of cylinder 51 is connected to the brake operating valve 19 by supply pipe 20. A second port 55 through the valve body 49 connects the cylinder bore 51 with an exhaust pipe 56 adapted to return fluid to the sump 17. A third port 57 through the valve body between ports 54 and 55 connects the cylinder bore to pipe 22 and thence to the brake cylinders 5 and 6. An annular groove 58 about valve spool 52 normally connects ports 54 and 57 by bridging them as shown in Fig. 3 and shuts off port 55 from port 57. Movement of valve spool 52 to the left against compression of spring 53 will cause it to disconnect the supply line 20 from brake cylinders 5, 6 and to connect them to exhaust line 56. To cause such movement, a cylinder bore 59 formed in valve body 49 and open to chamber 50 has a piston 60 slidably mounted therein. A port 61 connects the blind end of the cylinder 59 with the pipe 41 to deliver pressure fluid thereto from the servo valve 12. A lever 62 is pivotally mounted at 63 in chamber 50. One end of the lever rests upon a plunger 64 secured to piston 60. The opposite end of lever 62 rests upon plunger 65 which has a bearing on valve spool 52. The arrangement is such that when piston 60 is moved toward chamber 50 by pressure of fluid from the servo valve 12, spool valve 52 will be moved away from chamber 50 to close off supply from line 20 to brake cylinders 5, 6 and to open them to exhaust line 56.

To provide an adjustable torque limit, an adjusting screw 65$^a$ is fitted in a threaded opening through valve body 49 and bears against one end of a compression coil spring 66. A plunger 67 extends between the opposite end of the coil spring 66 and the lever 62 in a portion opposed to movement of the lever under pressure of piston 60. The screw 65$^a$ may be adjusted to alter the initial compression of spring 66 and therefore limit movement of the valve spool 52. Thus the pressure applied to port 61 from chamber 15 via passage 39 and pipe 41 attempts to force piston 60 to the right against the springs 53 and 66.

The invention contemplates use of a servo valve like the valve 12 at each brake of an aircraft undercarriage and also that one control valve may be so constructed as to be operated from a plurality of servo valves, such as have been described, acting in tandem, to control braking torque on a plurality of wheels. Referring again to Fig. 1, where the control valve is shown as operated from two servo valves 12 and 14, the chamber 50, in addition to having a three-way spool valve cylinder 51 and a piston cylinder 59 connected to pipe 41, has an additional similar piston cylinder 68 with a similar piston 69 slidably mounted therein. Cylinder 68 is connected by a port 70 and pipe 71 to the second servo valve 14. To equalize the sensing pressures of servo valves 12 and 14 on spool valve 52 an equalizing lever 72 is fulcrumed on spool valve plunger 65 and has its respective ends bearing against pistons 60 and 69. In this embodiment the torque limit adjustment is provided by an adjusting screw 73 threaded through the closed end of cylinder 51 and having a bearing plate 74 for a coil spring 75 which bears against spool valve 52 to modify its movement under the equalized pressure of pistons 60 and 69.

The operation of the apparatus is as follows: The operator applies the brake by depressing the pedal and opening valve 19 to supply fluid under pressure from pump 16 through the torque control valves 21 or 48, as the case may be, and pipes 20 and 22 to the brake operating cylinders 5 and 6, forcing the brake shoes 7, 8 against the brake disc 1. As the brake shoes apply torque to the disc 1, the brake support 3 tends to rotate about axle 10 and due to inclined spline 11 the support 3 and collar 9 tend to move axially. The axial movement continues unresisted until collar 9 presses plunger 13 to the left and with it valve spool 30 to a point where the pressure in chamber 15 increases sufficiently to prevent further motion of collar 9. The pressure in chamber 15 is thus a measure of brake torque. Now if this pressure rises to a value corresponding to the safe brake torque limit, this will force piston 60 to the right, as seen in Fig. 3, against torque adjustment spring 66 rocking lever 62 about its pivot by the amount permitted by the spring 66 pushing valve spool 52 to the left to open brake cylinder line 22 to exhaust through line 56 and shutting off pressure line 20. This will reduce the pressure on the brake shoes, reducing the torque on disc 1 and axial force to the left on collar 9. Continued presence of excessive pressure in chamber 15 would now move the collar 9 to the right which would reduce the pressure in chambers 15 and 59 causing piston 60 to return to the left and spring 53 to return valve spool 52 to the right.

Where more than one servo valve at a plurality of brakes are employed to operate a single torque control valve as in Fig. 1 of the drawings, the sum of the torque at a plurality of brakes act in combination to shift valve spool 52 to a pressure fluid cut off position against torque adjustment spring 75.

While a certain representative embodiment and details have been shown for the purpose of illustrating the invention, it will be apparent to those skilled in this art that various changes and modifications may be made therein without departing from the spirit of scope of the invention.

I claim:

1. A torque control for a hydraulically operated brake having a brake element rotatable with a wheel and a hydraulically operated brake shoe frictionally engageable with said brake element, said torque control comprising a torque control valve located in a supply line between a pressure supply and a brake-actuating pressure responsive element to control supply of fluid from said pressure supply to said brake actuating pressure responsive element, said torque control valve comprising a three-way valve for controlling supply to said pressure responsive element and a servomotor including a cylinder for controlling operation of said three-way valve, torque sensing means mounted at said brake and responsive to torque at said brake for alternately connecting said servomotor cylinder to a hydraulic pressure supply and an exhaust, adjustable means at said torque control valve for opposing movement of its three-way valve in a direction to close off supply of pressure fluid to said pressure responsive element, and a movable piston in said servomotor cylinder and biased by said adjustable means for actuating said three-way valve to cut off pressure supply and open exhaust to said pressure responsive element at said brake when torque at said brake is excessive, said adjustable bias means being adapted to restore supply of pressure to said brake actuating pressure responsive element to reapply the brake when brake torque is reduced to a nonexcessive amount.

2. A torque control for a hydraulically operated brake having a brake element rotatable with a wheel and a hydraulically operated brake shoe frictionally engageable with said brake element, said torque control comprising a torque control valve located in a supply line between a pressure supply and a brake-actuating pressure responsive element to control supply of fluid from said pressure supply to said brake actuating pressure responsive element, said torque control valve comprising a three-way valve for controlling supply to said pressure responsive element and a servomotor including a cylinder for controlling operation of said three-way valve, torque sensing means mounted at said brake and responsive to torque at said brake for alternately connecting said servomotor cylinder to a hydraulic pressure supply and an exhaust, a spring and an adjustment screw for adjusting tension thereof at said torque control valve for opposing movement of its three-way valve in a direction to close off supply of pressure fluid to said pressure responsive element, and a movable piston in said servomotor cylinder and biased by said adjustable means for actuating said three-way valve to cut off pressure supply and open exhaust to said pressure responsive element at said brake when torque at said brake is excessive, said adjustable bias means being adapted to restore supply of pressure to said brake actuating pressure responsive element to reapply the brake when brake torque is reduced to a non-excessive amount.

3. A torque control for a hydraulically operated brake having a brake element rotatable with a wheel and a hydraulically operated brake shoe frictionally engageable with said brake element, said torque control comprising a torque control valve located in a supply line between a pressure supply and a brake-actuating pressure responsive element to control supply of fluid from said pressure supply to said brake actuating pressure responsive element, said torque control comprising a three-way valve for controlling supply to said pressure responsive element and a servomotor including a cylinder for controlling operation of said three-way valve, a servo valve mounted at said brake and responsive to torque at said brake for alternately connecting said servomotor cylinder to a hydraulic pressure supply and an exhaust, adjustable means at said torque control valve for opposing movement of its three-way valve in a direction to close off supply of pressure fluid to said pressure responsive element, and a movable piston in said servomotor cylinder and biased by said adjustable means for actuating said three-way valve to cut off pressure supply and open exhaust to said pressure responsive element at said brake when torque at said brake is excessive, said adjustable bias means being adapted to restore supply of pressure to said brake actuating pressure responsive element to reapply the brake when brake torque is reduced to a non-excessive amount.

4. A torque control for a hydraulically operated brake having a brake element rotatable with a wheel and a hydraulically operated brake shoe frictionally engageable with said brake element, said torque control comprising a torque control valve located in a supply line between a pressure supply and a brake-actuating pressure responsive element to control supply of fluid from said pressure supply to a brake actuating pressure responsive element, said torque control valve comprising a three-way valve for controlling supply to said pressure responsive element and a servomotor including a cylinder for controlling operation of said three-way valve, a servo valve mounted at said brake and responsive to torque at said brake for alternately connecting said servomotor cylinder to a hydraulic pressure supply and an exhaust, a spring and an adjustment screw for adjusting tension thereof at said torque control valve for opposing movement of its three-way valve in a direction to close off supply of pressure fluid to said pressure responsive element, and a movable piston in said servomotor cylinder and biased by said adjustable means for actuating said three-way valve to cut off pressure supply and open exhaust to said pressure responsive element at said brake when torque at said brake is excessive, said spring being adapted to restore supply of pressure to said brake-actuating pressure-responsive element to reapply the brake when brake torque is reduced to a non-excessive amount.

5. A torque control for hydraulically operated brake elements rotatable with a plurality of wheels and hydraulically operated brake shoes frictionally engageable with said brake elements, said torque control comprising a torque control valve located in a supply line between a pressure supply and brake-actuating pressure responsive elements to control supply of fluid from said pressure supply to said brake actuating pressure responsive elements at each of said brakes, said torque control valve comprising a three-way valve for controlling supply to all of said pressure responsive elements and a servomotor including a plurality of cylinders for controlling operation of said three-way valve, torque sensing means mounted at each said brake and each responsive to torque at its brake for alternately connecting one of said servomotor cylinders to a hydraulic pressure supply and an exhaust, adjustable means at said torque control valve for opposing movement of its three-way valve in a direction to close off supply of pressure fluid to said pressure responsive elements, a piston in each said servomotor cylinder and biased by said adjustable means for actuating said three-way valve to cut off pressure supply and open exhaust to said pressure responsive elements at said brakes when torque at one of said brakes is excessive, said adjustable bias means being adapted to restore supply of pressure to said brake-actuating pressure responsive elements to reapply the brakes when brake torque is reduced to a non-excessive amount.

6. A torque control for hydraulically operated brake elements rotatable with a plurality of wheels and hydraulically operated brake shoes frictionally engageable with said brake elements, said torque control comprising a torque control valve located in a supply line between a pressure supply and a brake-actuating pressure-responsive element at each of said brakes to control supply of fluid from said pressure supply to said brake actuating pressure responsive elements at each of said brakes, said torque control valve comprising a three-way valve for controlling supply to all of said pressure responsive elements and a servomotor including a plurality of cylinders for controlling operation of said three-way valve, servo valves mounted at each said brake and each responsive to torque at its brake for alternately connecting one of said servomotor cylinders to a hydraulic pressure supply and an exhaust, adjustable means at said torque control valve for opposing movement of its three-way valve in a direction to close off supply of pressure fluid to said pressure responsive elements, a piston in each said cylinder and biased by said adjustable means for actuating said three-way valve to cut off pressure supply and open exhaust to said pressure responsive elements at said brakes when torque at one of said brakes is excessive, said adjustable bias means being adapted to restore supply of pressure to said brake-actuating pressure-responsive elements to reapply the brakes when brake torque is reduced to an non-excessive amount.

References Cited in the file of this patent

UNITED STATES PATENTS 2,277,554    McCoy                Mar. 24, 1942